(12) United States Patent
Veselova

(10) Patent No.: US 7,707,518 B2
(45) Date of Patent: Apr. 27, 2010

(54) LINKING INFORMATION

(75) Inventor: Olga Veselova, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 11/599,626

(22) Filed: Nov. 13, 2006

(65) Prior Publication Data
US 2008/0115069 A1  May 15, 2008

(51) Int. Cl.
*G06F 3/048* (2006.01)
(52) U.S. Cl. .................................. 715/841; 715/853
(58) Field of Classification Search .......... 715/206, 715/234, 760, 794, 818–820, 828–829, 841, 715/853
See application file for complete search history.

(56) References Cited

U.S. PATENT DOCUMENTS

| | | | |
|---|---|---|---|
| 5,202,828 A | 4/1993 | Vertelney et al. ............. 714/810 |
| 5,493,692 A | 2/1996 | Theimer et al. ............. 455/26.1 |
| 5,530,794 A | 6/1996 | Luebbert ..................... 715/524 |
| 5,537,628 A | 7/1996 | Luebbert ..................... 715/524 |
| 5,544,321 A | 8/1996 | Theimer et al. ............. 709/226 |
| 5,555,376 A | 9/1996 | Theimer et al. ............. 709/229 |
| 5,563,996 A | 10/1996 | Tchao ........................ 715/521 |
| 5,596,656 A | 1/1997 | Goldberg .................... 382/186 |
| 5,603,054 A | 2/1997 | Theimer et al. ................ 710/6 |
| 5,611,050 A | 3/1997 | Theimer et al. ............. 709/202 |
| 5,625,783 A | 4/1997 | Ezekiel et al. ............. 395/352 |
| 5,625,810 A | 4/1997 | Kurosu et al. |
| 5,701,424 A | 12/1997 | Atkinson .................... 715/808 |
| 5,724,595 A | 3/1998 | Gentner |
| 5,734,915 A | 3/1998 | Roewer ....................... 395/773 |
| 5,752,254 A | 5/1998 | Sakairi ....................... 715/530 |
| 5,760,768 A | 6/1998 | Gram ......................... 345/333 |
| 5,761,683 A | 6/1998 | Logan et al. ................ 715/206 |
| 5,765,156 A | 6/1998 | Guzak et al. ................ 707/100 |
| 5,778,346 A | 7/1998 | Frid-Nielsen et al. .......... 705/9 |
| 5,781,192 A | 7/1998 | Kodimer ..................... 715/770 |
| 5,798,760 A | 8/1998 | Vayda et al. ................ 715/834 |
| 5,801,693 A | 9/1998 | Bailey ........................ 715/769 |
| 5,812,865 A | 9/1998 | Theimer et al. ............. 709/228 |

(Continued)

FOREIGN PATENT DOCUMENTS

EP          0569133 A2    11/1993

(Continued)

OTHER PUBLICATIONS

U.S. Official Action mailed Dec. 20, 2008, in U.S. Appl. No. 11/326,583.

(Continued)

*Primary Examiner*—Weilun Lo
*Assistant Examiner*—Truc T Chuong
(74) *Attorney, Agent, or Firm*—Merchant & Gould

(57) ABSTRACT

Embodiments are provided to create and maintain one or more links or associations to different types of data and other information. In an embodiment, one or more links can be created and maintained, wherein the one or more links provide one or more pathways between structured information. A user can use a link to locate desired information, such as a notebook, section group, section, page, and/or page object for example. In one embodiment, a user can create a link to locate desired information, such as a notebook, section group, section, page, and/or page object, wherein user actions can be used to automatically determine a potential link target.

19 Claims, 9 Drawing Sheets

U.S. PATENT DOCUMENTS

| | | | |
|---|---|---|---|
| 5,838,321 A | 11/1998 | Wolf | 345/343 |
| 5,855,006 A | 12/1998 | Huemoeller et al. | 705/9 |
| 5,870,552 A * | 2/1999 | Dozier et al. | 715/234 |
| 5,884,306 A | 3/1999 | Bliss et al. | 707/7 |
| 5,898,434 A | 4/1999 | Small et al. | 715/810 |
| 5,924,099 A | 7/1999 | Guzak et al. | 707/100 |
| 5,940,078 A | 8/1999 | Nagarajayya et al. | 345/346 |
| 5,958,008 A | 9/1999 | Pogrebisky et al. | 709/223 |
| 5,970,455 A | 10/1999 | Wilcox et al. | 704/270 |
| 5,970,466 A | 10/1999 | Detjen et al. | 705/8 |
| 5,999,938 A | 12/1999 | Bliss et al. | 707/102 |
| 6,002,402 A | 12/1999 | Schacher | 715/810 |
| 6,025,837 A | 2/2000 | Matthews, III et al. | |
| 6,034,686 A | 3/2000 | Lamb et al. | 715/810 |
| 6,057,845 A | 5/2000 | Dupouy | 715/863 |
| 6,065,012 A | 5/2000 | Balsara et al. | 707/102 |
| 6,177,939 B1 | 1/2001 | Blish et al. | 715/770 |
| 6,233,591 B1 | 5/2001 | Sherman et al. | |
| 6,249,283 B1 | 6/2001 | Ur | 715/764 |
| 6,262,724 B1 | 7/2001 | Crow et al. | 715/723 |
| 6,269,389 B1 | 7/2001 | Ashe | 718/100 |
| 6,275,940 B1 | 8/2001 | Edwards et al. | 713/200 |
| 6,278,450 B1 | 8/2001 | Arcuri et al. | 345/334 |
| 6,282,548 B1 * | 8/2001 | Burner et al. | 715/234 |
| 6,309,305 B1 | 10/2001 | Kraft | 455/566 |
| 6,310,622 B1 | 10/2001 | Assente | 345/441 |
| 6,310,634 B1 | 10/2001 | Bodnar et al. | 715/854 |
| 6,321,242 B1 | 11/2001 | Fogg et al. | 715/236 |
| 6,389,434 B1 | 5/2002 | Rivette et al. | 715/209 |
| 6,411,311 B1 | 6/2002 | Rich et al. | 715/769 |
| 6,429,882 B1 | 8/2002 | Abdelnur et al. | 345/763 |
| 6,433,801 B1 | 8/2002 | Moon et al. | 345/840 |
| 6,448,987 B1 | 9/2002 | Easty et al. | 715/834 |
| 6,459,441 B1 | 10/2002 | Perroux et al. | 345/837 |
| 6,466,232 B1 | 10/2002 | Newell et al. | 345/700 |
| 6,490,634 B2 | 12/2002 | Coiner | 719/329 |
| 6,499,041 B1 | 12/2002 | Breslau et al. | 715/505 |
| 6,513,046 B1 | 1/2003 | Abbott, III et al. | 707/104.1 |
| 6,549,219 B2 | 4/2003 | Selker | 345/834 |
| 6,549,915 B2 | 4/2003 | Abbott, III et al. | 707/104.1 |
| 6,572,660 B1 | 6/2003 | Okamoto | |
| 6,606,653 B1 | 8/2003 | Ackermann, Jr. et al. | 709/219 |
| 6,618,732 B1 | 9/2003 | White et al. | 707/103 |
| 6,651,059 B1 | 11/2003 | Sundaresan et al. | 707/6 |
| 6,686,938 B1 | 2/2004 | Jobs et al. | 345/835 |
| 6,694,087 B1 | 2/2004 | Weaver | 386/52 |
| 6,704,770 B1 | 3/2004 | Ramakesavan | 709/205 |
| 6,708,202 B1 | 3/2004 | Shuman et al. | |
| 6,735,347 B1 | 5/2004 | Bates et al. | 382/282 |
| 6,747,675 B1 | 6/2004 | Abbott et al. | 345/740 |
| 6,751,777 B2 | 6/2004 | Bates et al. | 715/206 |
| 6,763,496 B1 | 7/2004 | Hennings et al. | 715/205 |
| 6,789,228 B1 | 9/2004 | Merril et al. | 715/500.1 |
| 6,791,580 B1 | 9/2004 | Abbott et al. | 345/744 |
| 6,801,223 B1 | 10/2004 | Abbott et al. | 345/740 |
| 6,802,041 B1 | 10/2004 | Rehm | 715/201 |
| 6,812,937 B1 | 11/2004 | Abbott et al. | 345/740 |
| 6,826,729 B1 | 11/2004 | Giesen et al. | 715/837 |
| 6,836,270 B2 | 12/2004 | Du | 345/419 |
| 6,842,877 B2 | 1/2005 | Robarts et al. | 715/708 |
| 6,848,075 B1 | 1/2005 | Becker et al. | 715/205 |
| 6,918,091 B2 | 7/2005 | Leavitt et al. | 715/785 |
| 6,924,797 B1 | 8/2005 | MacPhail | 345/326 |
| 6,925,496 B1 | 8/2005 | Ingram et al. | 709/224 |
| 6,944,821 B1 | 9/2005 | Bates et al. | 715/530 |
| 6,970,867 B1 | 11/2005 | Hsu et al. | 707/4 |
| 7,032,210 B2 | 4/2006 | Alloing et al. | 717/106 |
| 7,039,234 B2 | 5/2006 | Geidl et al. | 382/187 |
| 7,114,128 B2 | 9/2006 | Koppolu et al. | 715/781 |
| 7,143,338 B2 | 11/2006 | Bauchot et al. | 715/503 |
| 7,165,098 B1 | 1/2007 | Boyer et al. | 709/219 |
| 7,184,955 B2 | 2/2007 | Obrador et al. | 704/231 |
| 7,185,050 B2 | 2/2007 | Eld et al. | 709/203 |
| 7,188,073 B1 | 3/2007 | Tam et al. | 705/9 |
| 7,210,107 B2 | 4/2007 | Wecker et al. | 715/883 |
| 7,254,785 B2 | 8/2007 | Reed | 715/834 |
| 7,373,603 B1 | 5/2008 | Yalovsky et al. | 709/203 |
| 7,406,501 B2 | 7/2008 | Szeto et al. | 709/206 |
| 7,454,763 B2 | 11/2008 | Veselova et al. | 719/329 |
| 7,460,713 B2 | 12/2008 | Lapstun et al. | |
| 7,555,707 B1 | 6/2009 | Labarge et al. | 715/234 |
| 2001/0032214 A1 | 10/2001 | Bauchot et al. | 707/503 |
| 2001/0040590 A1 | 11/2001 | Abbott et al. | 715/700 |
| 2001/0040591 A1 | 11/2001 | Abbott et al. | 715/700 |
| 2001/0043231 A1 | 11/2001 | Abbott et al. | 715/700 |
| 2001/0043232 A1 | 11/2001 | Abbott et al. | 715/700 |
| 2002/0032689 A1 | 3/2002 | Abbott, III et al. | 707/104.1 |
| 2002/0044152 A1 | 4/2002 | Abbott, III et al. | 345/629 |
| 2002/0049785 A1 | 4/2002 | Bauchot | 707/503 |
| 2002/0052930 A1 | 5/2002 | Abbott et al. | 719/218 |
| 2002/0052963 A1 | 5/2002 | Abbott et al. | 709/230 |
| 2002/0054130 A1 | 5/2002 | Abbott, III et al. | 715/783 |
| 2002/0054174 A1 | 5/2002 | Abbott et al. | 709/219 |
| 2002/0078180 A1 | 6/2002 | Miyazawa | 709/219 |
| 2002/0078204 A1 | 6/2002 | Newell et al. | 709/225 |
| 2002/0080155 A1 | 6/2002 | Abbott et al. | 715/700 |
| 2002/0080156 A1 | 6/2002 | Abbott et al. | 715/700 |
| 2002/0083025 A1 | 6/2002 | Robarts et al. | 709/220 |
| 2002/0083158 A1 | 6/2002 | Abbott et al. | 709/220 |
| 2002/0087525 A1 | 7/2002 | Abbott et al. | 707/3 |
| 2002/0087534 A1 | 7/2002 | Blackman et al. | 707/4 |
| 2002/0087642 A1 | 7/2002 | Wei et al. | 709/206 |
| 2002/0091739 A1 | 7/2002 | Ferlitsch et al. | 707/526 |
| 2002/0099777 A1 | 7/2002 | Gupta et al. | 709/206 |
| 2002/0099817 A1 | 7/2002 | Abbott et al. | 709/224 |
| 2002/0120697 A1 | 8/2002 | Generous et al. | 709/306 |
| 2002/0133520 A1 | 9/2002 | Tanner | 715/202 |
| 2002/0138582 A1 | 9/2002 | Chandra et al. | |
| 2002/0140731 A1 | 10/2002 | Subramaniam et al. | 345/762 |
| 2002/0161800 A1 | 10/2002 | Eld et al. | 707/512 |
| 2002/0161804 A1 | 10/2002 | Chiu et al. | 707/512 |
| 2002/0196293 A1 | 12/2002 | Suppan et al. | 345/853 |
| 2003/0013483 A1 | 1/2003 | Ausems et al. | 455/556.1 |
| 2003/0014395 A1 | 1/2003 | Ruvolo et al. | 707/3 |
| 2003/0014490 A1 | 1/2003 | Bates et al. | 709/206 |
| 2003/0020749 A1 | 1/2003 | Abu-Hakima et al. | 345/752 |
| 2003/0046401 A1 | 3/2003 | Abbott et al. | 709/228 |
| 2003/0050927 A1 | 3/2003 | Hussam | 707/5 |
| 2003/0069877 A1 | 4/2003 | Grefenstette et al. | 707/2 |
| 2003/0070143 A1 | 4/2003 | Maslov | 715/513 |
| 2003/0076352 A1 | 4/2003 | Uhlig et al. | |
| 2003/0084104 A1 | 5/2003 | Salem et al. | 709/205 |
| 2003/0088534 A1 | 5/2003 | Kalantar et al. | 706/50 |
| 2003/0097361 A1 | 5/2003 | Huang et al. | 707/10 |
| 2003/0100999 A1 | 5/2003 | Markowitz | 702/20 |
| 2003/0135565 A1 | 7/2003 | Estrada | 709/206 |
| 2003/0154254 A1 | 8/2003 | Awasthi | 709/206 |
| 2003/0154476 A1 | 8/2003 | Abbott, III et al. | 725/37 |
| 2003/0172168 A1 | 9/2003 | Mak et al. | 709/230 |
| 2003/0172384 A1 | 9/2003 | Comps | 370/474 |
| 2003/0187930 A1 | 10/2003 | Ghaffar et al. | 709/205 |
| 2003/0196196 A1 | 10/2003 | Nylander et al. | 711/159 |
| 2003/0212680 A1 | 11/2003 | Bates et al. | 707/7 |
| 2003/0222899 A1 | 12/2003 | Alvesalo | 345/716 |
| 2004/0001093 A1 | 1/2004 | Sellers et al. | 345/766 |
| 2004/0039779 A1 | 2/2004 | Amstrong et al. | 709/204 |
| 2004/0054736 A1 | 3/2004 | Daniell et al. | 709/206 |
| 2004/0063400 A1 | 4/2004 | Kim | 455/3.06 |
| 2004/0073679 A1 | 4/2004 | Martens et al. | 709/227 |
| 2004/0098398 A1 | 5/2004 | Ahn et al. | 707/100 |
| 2004/0109033 A1 | 6/2004 | Vienneau et al. | 345/863 |
| 2004/0128613 A1 | 7/2004 | Sinisi | 715/500 |
| 2004/0153445 A1 | 8/2004 | Horvitz et al. | 707/3 |
| 2004/0158611 A1 | 8/2004 | Daniell et al. | 709/206 |

| | | | |
|---|---|---|---|
| 2004/0168119 A1 | 8/2004 | Liu et al. ............... | 715/501.1 |
| 2004/0172455 A1 | 9/2004 | Green et al. ............. | 709/207 |
| 2004/0174392 A1 | 9/2004 | Bjoernsen et al. ......... | 345/751 |
| 2004/0177122 A1 | 9/2004 | Appelman et al. ......... | 709/206 |
| 2004/0177319 A1 | 9/2004 | Horn .................... | 715/501.1 |
| 2004/0189694 A1 | 9/2004 | Kurtz et al. ............. | 345/738 |
| 2004/0194025 A1 | 9/2004 | Hubert et al. ........... | 715/513 |
| 2004/0221243 A1 | 11/2004 | Twerdahl et al. ......... | 715/834 |
| 2004/0230599 A1 | 11/2004 | Moore et al. ............ | 707/102 |
| 2004/0243677 A1 | 12/2004 | Curbow et al. ........... | 709/206 |
| 2004/0243941 A1 | 12/2004 | Fish .................... | 715/752 |
| 2004/0267625 A1 | 12/2004 | Feng et al. .............. | 705/26 |
| 2004/0267706 A1 | 12/2004 | Springer et al. ........... | 707/3 |
| 2004/0268231 A1 | 12/2004 | Tunning ................. | 715/513 |
| 2004/0268263 A1 | 12/2004 | Van Dok et al. .......... | 715/733 |
| 2005/0004989 A1 | 1/2005 | Satterfield et al. ........ | 709/206 |
| 2005/0004990 A1 | 1/2005 | Durazo et al. ........... | 709/206 |
| 2005/0005235 A1 | 1/2005 | Satterfield et al. ........ | 715/245 |
| 2005/0005249 A1 | 1/2005 | Hill et al. ............... | 715/810 |
| 2005/0010871 A1 | 1/2005 | Ruthfield et al. ......... | 715/712 |
| 2005/0034078 A1 | 2/2005 | Abbott et al. ............ | 715/740 |
| 2005/0055424 A1 | 3/2005 | Smith ................... | 709/219 |
| 2005/0064852 A1 | 3/2005 | Baldursson ............. | 455/414.2 |
| 2005/0097465 A1 | 5/2005 | Giesen et al. ............ | 715/700 |
| 2005/0102365 A1 | 5/2005 | Moore et al. ............ | 709/207 |
| 2005/0102607 A1 | 5/2005 | Rouselle et al. .......... | 715/501.1 |
| 2005/0102639 A1 | 5/2005 | Dove .................... | 717/178 |
| 2005/0108619 A1 | 5/2005 | Theall et al. ............. | 715/229 |
| 2005/0114521 A1 | 5/2005 | Lee ..................... | 709/228 |
| 2005/0119018 A1 | 6/2005 | Kim ..................... | 455/466 |
| 2005/0125717 A1 | 6/2005 | Segal et al. .............. | 715/512 |
| 2005/0149851 A1 | 7/2005 | Mittal | |
| 2005/0154761 A1 | 7/2005 | Lee et al. ............... | 707/104.1 |
| 2005/0165795 A1 | 7/2005 | Myka et al. ............. | 707/100 |
| 2005/0166154 A1 | 7/2005 | Wilson et al. ............ | 715/751 |
| 2005/0175089 A1 | 8/2005 | Jung .................... | 375/240.03 |
| 2005/0183008 A1 | 8/2005 | Crider et al. ............. | 715/517 |
| 2005/0208962 A1 | 9/2005 | Kim ..................... | 455/550.1 |
| 2005/0233744 A1 | 10/2005 | Karaoguz ............... | 455/432.3 |
| 2005/0240590 A1 | 10/2005 | Shimizu et al. ........... | 707/9 |
| 2005/0245241 A1 | 11/2005 | Durand .................. | 455/408 |
| 2005/0286414 A1 | 12/2005 | Young et al. ............. | 370/216 |
| 2005/0289109 A1 | 12/2005 | Arrouye et al. ........... | 707/1 |
| 2006/0036945 A1 | 2/2006 | Radtke et al. ............ | 715/708 |
| 2006/0036950 A1 | 2/2006 | Himberger et al. ........ | 715/732 |
| 2006/0036965 A1 | 2/2006 | Harris et al. ............. | 715/777 |
| 2006/0053379 A1 | 3/2006 | Henderson et al. ........ | 715/751 |
| 2006/0069603 A1 | 3/2006 | Williams et al. .......... | 705/9 |
| 2006/0069604 A1 | 3/2006 | Leukart et al. ........... | 705/9 |
| 2006/0069617 A1* | 3/2006 | Milener et al. ........... | 715/501.1 |
| 2006/0074844 A1 | 4/2006 | Frankel .................. | 707/1 |
| 2006/0075347 A1 | 4/2006 | Rehm | |
| 2006/0095452 A1 | 5/2006 | Jansson et al. ........... | 707/101 |
| 2006/0139709 A1 | 6/2006 | Bifano et al. ............. | 358/527 |
| 2006/0150109 A1 | 7/2006 | Schultz et al. ............ | 715/759 |
| 2006/0195461 A1 | 8/2006 | Lo et al. | |
| 2007/0022372 A1 | 1/2007 | Liu et al. ................ | 715/201 |
| 2007/0124325 A1 | 5/2007 | Moore et al. ............ | 707/102 |
| 2007/0156627 A1 | 7/2007 | D'Alicandro ............ | 707/1 |
| 2007/0156643 A1 | 7/2007 | Sareen et al. ............ | 707/2 |
| 2007/0168278 A1 | 7/2007 | Peterson et al. .......... | 705/38 |
| 2007/0168378 A1 | 7/2007 | Sareen et al. ............ | 707/102 |
| 2007/0245223 A1 | 10/2007 | Siedzik et al. ........... | 715/500.1 |
| 2007/0245229 A1 | 10/2007 | Siedzik et al. ........... | 715/512 |
| 2008/0115048 A1 | 5/2008 | Veselova et al. .......... | 715/205 |

FOREIGN PATENT DOCUMENTS

| | | |
|---|---|---|
| EP | 0986011 A2 | 3/2000 |
| EP | 1223503 A2 | 7/2002 |
| EP | 1376337 A1 | 2/2004 |
| EP | 1630694 A2 | 3/2006 |
| GB | 2391148 A | 1/2004 |
| JP | 2001265753 A | 9/2001 |
| WO | WO 9800787 A1 | 8/1998 |
| WO | WO 2004038548 A2 | 5/2004 |
| WO | WO 2004038548 A3 | 5/2004 |
| WO | WO 2004038548 R4 | 5/2004 |
| WO | WO 2004086254 A1 | 10/2004 |
| WO | WO 2005001709 A2 | 1/2005 |
| WO | WO 2005067328 A1 | 7/2005 |
| WO | WO 2005110010 A2 | 11/2005 |
| WO | WO 2007081783 A2 | 7/2007 |
| WO | WO 2007081783 A3 | 7/2007 |
| WO | WO 2007081786 A2 | 7/2007 |
| WO | WO 2007081786 A3 | 7/2007 |

OTHER PUBLICATIONS

Braun, Owen, "Owen Braun: OneNote 12: Linking related notes together (really)", Date: Oct. 6, 2005, http://blogs.msdn.com/owen_braun/archive/2005/10/06/477615.aspx.

Braun, Owen, "Owen Braun: OneNote 12: Linking related notes together", Date: Oct. 6, 2005, http://blogs.msdn.com/owen_braun/archive/2005/10/06/477610.aspx.

Braun, Owen, "Owen Braun: OneNote 12: New Extensibility in OneNote 12", Date: Oct. 6, 2005, http://blogs.msdn.com/owen_braun/archive/2005/12/15/503879.aspx.

"Tomboy : Simple note taking", Date: 2004-2006, http://www.beatniksoftware.com/tomboy/.

U.S. Appl. No. 10/420,621, filed Apr. 22, 2003, entitled "Creation and Recognition of Specially-Marked Items in Notes".

U.S. Appl. No. 10/387,287, filed Mar. 12, 2003, entitled "System and Method for Customizing Note Flags".

U.S. Appl. No. 10/397,103, filed Mar. 26, 2003, entitled "System and Method for Linking Page Content with a Media File and Displaying the Links".

U.S. Official Action mailed Oct. 19, 2004 in U.S. Appl. No. 10/397,103.

U.S. Official Action mailed Sep. 23, 2005 in U.S. Appl. No. 10/420,621.

U.S. Official Action mailed Mar. 6, 2006 in U.S. Appl. No. 10/664,740.

U.S. Official Action mailed Jun. 12, 2006 in U.S. Appl. No. 10/387,287.

U.S. Official Action mailed Jun. 13, 2006 in U.S. Appl. No. 10/420,621.

U.S. Official Action mailed Feb. 7, 2007 in U.S. Appl. No. 10/387,287.

U.S. Official Action mailed Feb. 20, 2007 in U.S. Appl. No. 10/420,621.

U.S. Official Action mailed Apr. 19, 2007 in U.S. Appl. No. 10/397,103.

U.S. Official Action mailed Jul. 13, 2007 in U.S. Appl. No. 10/664,740.

U.S. Official Action mailed Jul. 16, 2007 in U.S. Appl. No. 11/063,309.

U.S. Official Action mailed Oct. 19, 2007 in U.S. Appl. No. 10/387,287.

U.S. Official Action mailed Nov. 5, 2007 in U.S. Appl. No. 10/420,621.

U.S. Official Action mailed Jan. 7, 2008 in U.S. Appl. No. 10/397,103.

U.S. Official Action mailed Jan. 7, 2008 in U.S. Appl. No. 11/063,309.

U.S. Official Action mailed Mar. 10, 2008 in U.S. Appl. No. 10/955,232.

U.S. Official Action mailed May 12, 2008 in U.S. Appl. No. 10/397,103.

U.S. Official Action mailed Feb. 21, 2008 in U.S. Appl. No. 11/326,110.

U.S. Official Action mailed Mar. 5, 2008 in U.S. Appl. No. 11/326,583.

U.S. Official Action mailed Jul. 9, 2008 in U.S. Appl. No. 10/387,287.

U.S. Official Action mailed Nov. 12, 2008 in U.S. Appl. No. 10/955,232.
U.S. Official Action mailed Nov. 17, 2008 in U.S. Appl. No. 11/326,110.
U.S. Official Action mailed Dec. 24, 2008 in U.S. Appl. No. 10/420,621.
PCT Search Report mailed Jun. 22, 2007 in PCT/US2007/000248.
PCT Search Report mailed Jun. 22, 2007 in PCT/US2007/000244.
Chinese First Office Action mailed Oct. 31, 2008 in 200510088531.1.
Microsoft Corporation, "Microsoft Snipping Tool for Tablet PC Preview Release Help: Capturing Clips; Capturing Regions; Displaying or Hiding Links", Nov. 2002, 4 pp.
Leszynski Group, "News Story: Leszynski Group Powers Bill Gates' Tablet PC Launch Keynote", Nov. 2002, 1 pp.
Leszynski Group, "Tablet PC Solutions", Nov. 2002, 3 pp.
IBM Corporation, "Dragging Marked Data to an Editor Window", Technical Disclosure Bulletin, Mar. 1992, vol. 34, No. 10B, pp. 202-203.
IBM Corporation, "Source Dimension Copying Using the Standard Clipboard", Technical Disclosure Bulletin, Aug. 1994, vol. 37, No. 8, pp. 419-420.
Apperley, M. et al., "Breaking the Copy/Paste Cycle: The Stretchable Selection Tool", Computer Science Department, New Zealand, Feb. 2000, pp. 1-8.
Rich, Charles and Sidner, Candace L., "Segmented Interaction History in a Collaborative Interface Agent," 1997 ACM, pp. 23-30.
Dwelly, Andrew, "Functions and Dynamic User Interfaces," 1989 ACM, pp. 371-381.
Kurtenbach, Gordon et al.., "The Hotbox: Efficient Access to a Large Number of Menu-items," ACM 1999, pp. 231-237.
Rich, Charles and Sidner, Candace L., "Adding a Collaborative Agent to Graphical User Interfaces," 1996 ACM, pp. 21-30.
Boyce, Jim, "Microsoft Outlook Inside Out," 2001, Redmond, Washington, pp. 67, 68, 109, 110, 230, 231, 310, 316-318, 798.
Halvorson, Michael and Young, Michael, "Microsoft Office XP Inside Out," 2001, Redmond, Washington, pp. 1005-1009, 1015, 1023-1028, 1036-1039, 1093.
Riggsby, Matt et al., "Mastering Lotus Notes and Domino 6," 2003, Alameda, California, pp. 135-139.
Riggsby, Matt, et al., "Mastering Lotus Notes and Domino 6," 2003, Alameda, California, pp. 135-138, 607-612.
"Primary Windows," http://www-03.ibm.com/servers/eserver/iseries/navigator/guidelines/primary.html, date unknown (printed Feb. 23, 2007, 23 pages.
Schumaker, Dennis, "User Interface Standards," http://msdn2.microsoftt.com/en-us/library/aa217660(office.11.d=printer).aspx, Sep. 2001, 5 pages.
Budinsky, F. et al., "WebSphere Studio Overview," http://researchweb.watson.ibm.com/journal/sj/432/budinsky.html, May 6, 2004, 25 pages.
Padwick, Gordon, Ebook titled "Special Edition Using Microsoft Outlook 2002", published May 17, 2001, pp. 1-7.
"Evermore Integrated Office if the 'First REAL Office'", Evermore Software Ltd., 2001-2004, retrieved Jan. 24, 2007, http://web.archive.org/web/20040106195344/www.evermoresw.com/weben/product/eio_ . . . , 2 pp.
Young et al., "Microsoft Office System Inside Out: 2003 Edition", published Sep. 10, 2003, pp. 1-168.
"Setting Reminders in Outlook", California Lutheran University Information Systems and Services, Nov. 2005, 3 pp.
Slovak, Ken, "Absolute Beginner's Guide to Microsoft Office Outlook 2003", Que, Oct. 1, 2003; Chapter 1: Personal Information Management, Chapter 2: Working in Outlook's User Interface, Chapter 4: Flagging E-Mails and E-Mail Reminders, Chapter 7, Chapter 12: Using Advanced Find, 6 pp.
Gnome 2.8 Desktop User Guide, Sun Gnome Documentation Team, 2004, 67 pp.
Henzinger, Monica, "Link Analysis in Web Information Retrieval", Date: 2000, http://www.acm.org/sigs/sigmod/disc/disc01/out/websites/deb_september/henzinge.pdf, 6 pp.
Kraynak, Joe, "Absolute Beginner's Guide to Microsoft Office Excel 2003", Que, Sep. 2003, 14 pp.

Baker, Richard, "Microsoft Office 2004 for Mac in a Snap", Sams, Aug. 2004, 17 pp.
European Search Report mailed Jan. 30, 2009 in 07717882.0-1527/1977340.
European Search Report mailed Jan. 30, 2009 in 07717837.4-1527/1977339.
"Microsoft Office 2003 Editions Product Guide", Internet Publication, Sep. 2003, 168 pp.
U.S. Official Action mailed Mar. 13, 2009 in U.S. Appl. No. 10/955,232.
U.S. Official Action mailed Mar. 18, 2009 in U.S. Appl. No. 10/387,287.
U.S. Official Action mailed May 20, 2009 in U.S. Appl. No. 11/599,598.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2.html, Aug. 20, 1998, 3 pgs.
"What's Hot in Internet Services?" http://www.webreference.com/html/tutorial5/3html, Aug. 20, 1998, 3 pgs.
"The Style Element & CSS Selectors," http://www.webreference.com/html/tutorial5/4.html, Aug. 20, 1998, 3 pgs.
"The Style Element & CSS Selectors," http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
"ID & Class Selectors, Pseudoclasses," http://www.webreference.com/html/tutorial5/7.html, Aug. 20, 1998, 3 pgs.
"ID & Class Selectors, Pseudoclasses," http://www.webreference.com/html/tutorial5/8.html, Aug. 20, 1998, 2 pp.
"External Style Sheets," http://www.webreference.com/html/tutorial5/9.html, Aug. 20, 1998, 3 pp.
"Raman, Cascaded Speech Style Sheets," 1997, 7 pp.
Hopkins, "The Design and Implementation of Pie Menu", Originally published in Dr. Dobb's Journal, 1991, pp. 1-7.
Lewis, "Easy Microsoft Office 2003", Sep. 2003, 10 pp.
Microsoft Press, "Microsoft Windows User Experience", 1999, pp. 51-52.
Long, Jr., et al., "A Prototype User Interface For A Mobile Multimedia Terminal," Department of Electrical Engineering and Computer Sciences, The University of California at Berkeley, Berkeley, CA, http://sigchi.org/chi95/Electronic/document/intex;/acl_bdy.htm, retrieved Jan. 10, 2006, 4 pp.
Landay, et al., "NotePals: Sharing and Synchronizing Handwritten Notes with Multimedia Documents," EECS Department, University of California, Berkeley, CA, http://cs.berkeley.edu/~landay/research/publications/hcscw/HCSCW-NotePals.html, retrieved Jan. 10, 2006, 8 pp.
Singh, et al., "Collaborative Note Taking Using PDAs" Department of Computer Science, Naval Postgraduate School, Monterey, CA—http://www.fxpal.com/people/denoue/publications/jise_2005.pdf, 2005, pp. 835-848.
Weverka, Microsoft Office OneNote 2003, Step by Step, http://proquest.safaribooksonline.com/0735621098, Microsoft Press, Jul. 13, 2004, pp. 1-64.
Harter et al., A Distributed Location System for the Active Office, IEEEE Network, 1994, pp. 62-70.
Chen et al., A Survey of Context-Aware Mobile Computing Research, Dartmouth Computer Science Technical Report, 2000, 16 pp.
Schilit, A System Architecture for Context-Aware Mobile Computing, Columbia University, 1995, 153 pp.
Spreitzer et al., Providing Location Information in a Ubiquitous Computing Environment, SIGOPS '93, pp. 270-283.
Theimer et al., Operating System Issues for PDAs, in Fourth Workshop on Workstation Operating Systems, 1993, 7 pp.
Want, Active Badges and Personal Interactive Computing Objects, IEEE Transactions on Consumer Electronics, 1992, 11 pp., vol. 38—No. 1.
Schilit et al., The Parc Tab Mobile Computing System, IEEE WWOS-IV, 1993, 4 pages.

Schilit et al., Context-Aware Computing Applications, In Proceedings of the Workshop on Mobile Computing Systems and Applications, Dec. 1994, pp. 85-90.

Schilit et al., Customizing Mobile Applications, Proceedings USENIX Symposium on Mobile and Location Independent Computing, Aug. 1993, 9 pages.

Spreitzer et al, Architectural Considerations for Scalable, Secure, Mobile Computing with Location Information, In the 14$^{th}$ International Conference on Distributed Computing Systems, Jun. 1994, pp. 29-38.

Spreitzer et al., Scalable, Secure, Mobile Computing with Location Information, Communications of the ACM, Jul. 1993, 1 page, vol. 36—No. 7.

Want et al., The Active Badge Location System, ACM Transactions on Information Systems, Jan. 1992, pp. 91-102, vol. 10—No. 1.

Weiser, Some Computer Science Issues in Ubiquitous Computing, Communications of the ACM, Jul. 1993, pp. 75-84, vol. 36—No. 7.

Billinghurst et al., An Evaluation of Wearable Information Spaces, Proceedings of the Virtual Reality Annual International Symposium, 1998, 8 pp.

Rhodes, Remembrance Agent: A continuously running automated information retrieval system, The Proceedings of The First International Conference on The Practical Application Of Intelligent Agents and Multi Agent Technology, 1996, pp. 487-495.

Horvitz et al., In Pursuit of Effective Handsfree Decision Support: Coupling Bayesian Inference, Speech Understanding, and User Models, 1995, 8 pp.

Rhodes, The Wearable Remembrance Agent: A System for Augmented Theory, The Proceedings of The First International Symposium on Wearable Computers, Oct. 1997, pp. 123-128.

Horvitz et al., Attention-Sensitive Alerting in Computing Systems, Microsoft Research, Aug. 1999.

Schilit et al., Disseminating Active Map Information to Mobile Hosts, IEEE Network, 1994, pp. 22-32, vol. 8—No. 5.

Billinghurst et al., Wearable Devices: New Ways to Manage Information, IEEE Computer Society, Jan. 1999, pp. 57-64.

U.S. Official Action mailed Jun. 18, 2007 in U.S. Appl. No. 10/954,954.

U.S. Official Action mailed Mar. 18, 2008 in U.S. Appl. No. 10/954,954.

U.S. Official Action mailed Oct. 28, 2008 in U.S. Appl. No. 10/954,954.

U.S. Official Action mailed Dec. 11, 2008 in U.S. Appl. No. 11/405,251.

U.S. Official Action mailed May 21, 2009 in U.S. Appl. No. 11/326,583.

U.S. Official Action mailed Jun. 11, 2009 in U.S. Appl. No. 11/405,256.

U.S. Official Action mailed Jun. 15, 2009 in U.S. Appl. No. 10/420,621.

U.S. Official Action mailed Jul. 17, 2009 in U.S. Appl. No. 11/405,251.

U.S. Official Action mailed Aug. 7, 2009 in U.S. Appl. No. 11/326,110.

U.S. Official Action mailed Oct. 19, 2009 in U.S. Appl. No. 11/599,598.

PCT Search Report dated Aug. 27, 2007 in PCT/US2007/007233.

PCT Search Report dated Sep. 21, 2007 in PCT/US2007/007231.

Mexican Official Action dated Feb. 20, 2009 in PA/a/2005/007147—English Translation Only.

European Examination Report dated Mar. 25, 2009 in 07717882.0-1527/1977340.

European Examination Report dated Apr. 1, 2009 in 07717837.4-1527/1977339.

Starner, Wearable Computing and Contextual Awareness, Massachusetts Institute of Technology, Jun. 1999, 248 pp.

Rhodes, The Wearable Remembrance Agent: A System for Augmented Memory, Personal Technologies Journal Special Issue on Wearable Computing, 1997, 12 pp.

Workshop on Wearable Computing Systems, Aug. 19-21, 1996.

Billinghurst, Research Directions in Wearable Computing, University of Washington, May 1998, 48 pp.

Weiser, The Computer for the 21$^{st}$ Century, Scientific American, Sep. 1991, 8 pp.

Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pp.

Losee, Jr., Minimizing information overload: the ranking of electronic messages, Journal of Information Science 15, Elsevier Publishers B.V., 1989, pp. 179-189.

Russian Office Action dated Jun. 15, 2009 in 2005120371.

Chinese Second Office Action dated Jul. 10, 2009 in 200510088531.1.

European Examination dated Oct. 6, 2009 in 07717882.0-1527.

European Examination dated Oct. 6, 2009 in 07717837.4-1527.

U.S. Official Action mailed Oct. 14, 2009 in U.S. Appl. No. 10/955,232.

* cited by examiner

LINKING INFORMATION

BACKGROUND

Note-taking and tablet applications are becoming more popular for users who prefer to use a straightforward interface and tools when interacting and communicating with others. Currently, users can use note taking applications to create and organize ideas, correspondence, and other information. For example, users can use a note-taking application to create notebooks, folders, sections, pages, etc. However, it is difficult to link and relate information using current note-taking applications. Users become frustrated when they are unable to link and relate information in a meaningful and resilient manner. A user may have to perform lengthy and sometimes unsuccessful searches to find relevant information, such as notebooks, sections, pages, notes, and other information.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to create and maintain one or more links or associations to different types of data and other information. In an embodiment, one or more links can be created and maintained, wherein the one or more links provide one or more pathways between structured information. In one embodiment, a user can create a link to locate desired information, such as a notebook, section group, section, page, and/or page object, wherein user actions can be used to automatically determine a potential link target.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are provided to create and maintain one or more links or associations to different types of data and other information. In an embodiment, one or more links can be created and maintained, wherein the one or more links provide one or more pathways between structured information. The various embodiments enable a user to quickly and efficiently create a link to a desired target. Correspondingly, a user does not have to determine or know the actual address and/or path to the desired target when creating a link.

In one embodiment, a note-taking application is configured to allow a user to quickly and efficiently create links to desired information. The various embodiments enable users to create references or associations between various items of a hierarchal information structure, but are not so limited. For example, a user can use the note-taking application to create links to notebooks, sections, pages, and/or page objects. The note-taking application enables users to quickly and efficiently create links. Users can use the note-taking application and simply point to a notebook, section, page, and/or page object to create a link to the desired target without having to determine or worry about the actual address or path to the target. Accordingly, the note-taking application is configured to create and maintain links that account for the unique nature of notes and associated information. Thereafter, a user can use a link to locate desired information, such as locating a notebook, section group, section, page, and/or page object.

Figure 1:
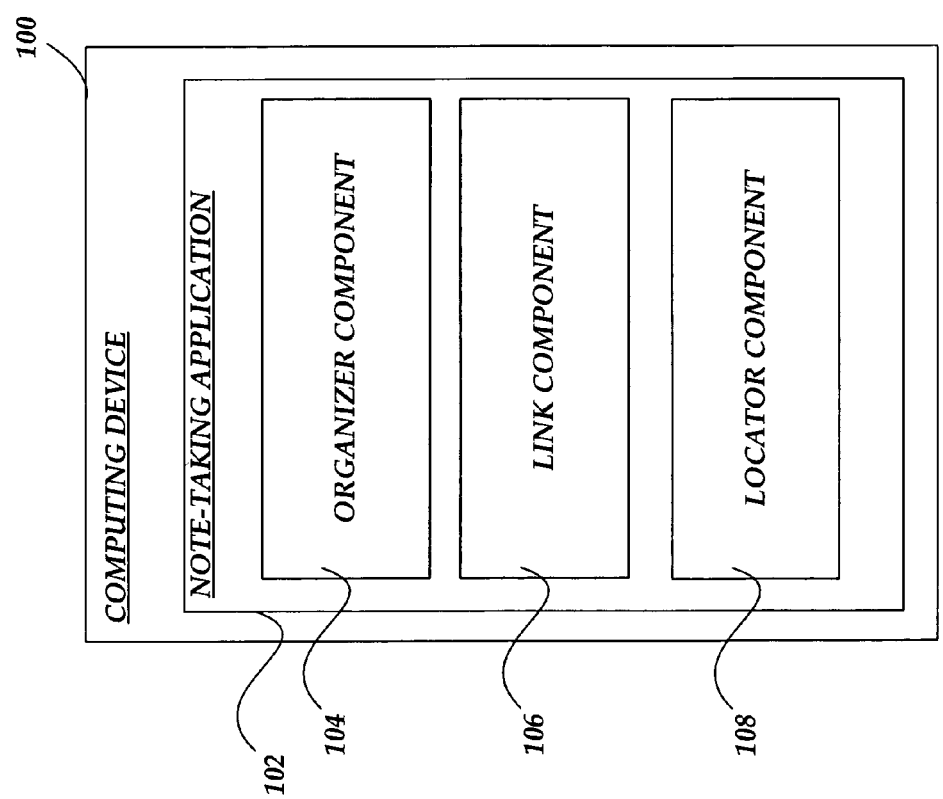
FIG. 1 is a block diagram of a computing device that includes a note-taking application.

FIG. 1 is a block diagram of a computing device 100 that includes a note-taking application 102. The computing device 100 includes networking, security, and other communication components configured to provide communication functionality with other computing and/or communication devices. The computing device 100 can include a desktop computer, laptop computer, tablet computer, handheld device, and other communication device. The note-taking application 102 can be installed on the computing device 100 or packaged and sold separately for installation at some desired time.

The note-taking application 102 is configured to capture and organize notes, which may include text, handwriting, pictures, drawings, audio, video, and/or other information. The note-taking application 102 can be used to record, organize, edit, and/or transmit information, including audio, textual, graphical, and other visual information. For example, the note-taking application 102 can be used to view and edit meeting agendas, to-do lists, date/event reminders, etc. As further example, the note-taking application 102 can also be used to share information, such as one or more notes, between one or more computing devices, such as one or more computers of a distributed computer network.

The note-taking application 102 includes an organizer component 104 to organize information associated with the note-taking application 102. For example, the organizer component 104 can be used to organize notebooks, section groups, sections, pages, page objects, and/or other information. The note-taking application 102 also includes a link component 106. The link component 106 is configured to create and maintain one or more links to different types of data and other information. For example, the link component 106 can be used to create hyperlinks that point to web content, such as to web objects and/or web locations of the World Wide Web (WWW). The note-taking application 102 also includes a locator component 108 for locating a link target. In an embodiment, the locator component 108 is configured to use a path associated with a link to locate the link target.

The link component 106 is also configured to quickly and efficiently create links to a notebook, section, page, page object (e.g. image, paragraph, sentence, etc.), and other note-relating information. In one embodiment, the link component 106 is configured to quickly and efficiently create links to a desired target, wherein the link is created based in part on a user's interaction with the note-taking application 102, as described further below. For example, the link component 106 can be used to create various associations, including, but not limited to: a table of contents on a page with links to the other pages in the section or with links to other parts of the same page; a favorites list that comprises a list of links to pages and sections are visited or used frequently; a definition or reference link from a term, a name, or a topic on one page to more detailed information in another place in the notes.

The note-taking application 102 and link component 106 can be used to create links to other notes on a page, in an e-mail, and/or in other documents. For example, a user can create a link and then send the link to one or more recipients in an e-mail. Thereafter, a recipient can click the link to jump to the link target (e.g. if the notes are associated with a shared notebook). Links created with the note-taking application 102 and associated link component 106 can be used inside and outside of a note-taking application (e.g. e-mail, meeting items, documents, web pages, etc.).

The note-taking application 102 can use the organizer component 104 to organize notes and the link component 106 to create links to items associated with a hierarchal information structure. In an embodiment, the note-taking application 102 is configured to organize notes according to a hierarchal structure, such that pages are contained within sections, sections are contained within section groups, and section groups are contained within notebooks (e.g. notebook>section group>section>page>page object). A user can use the note-taking application 102 to create a link to refer to information at any level. For example, a user can use the note-taking application 102 to create links that point to a notebook, section, page, and/or paragraph of notes. As described herein, a user can use the note-taking application 102 to quickly and efficiently create a link to a link target, without having to undergo an onerous and complicated procedure to create the link.

Figure 2:
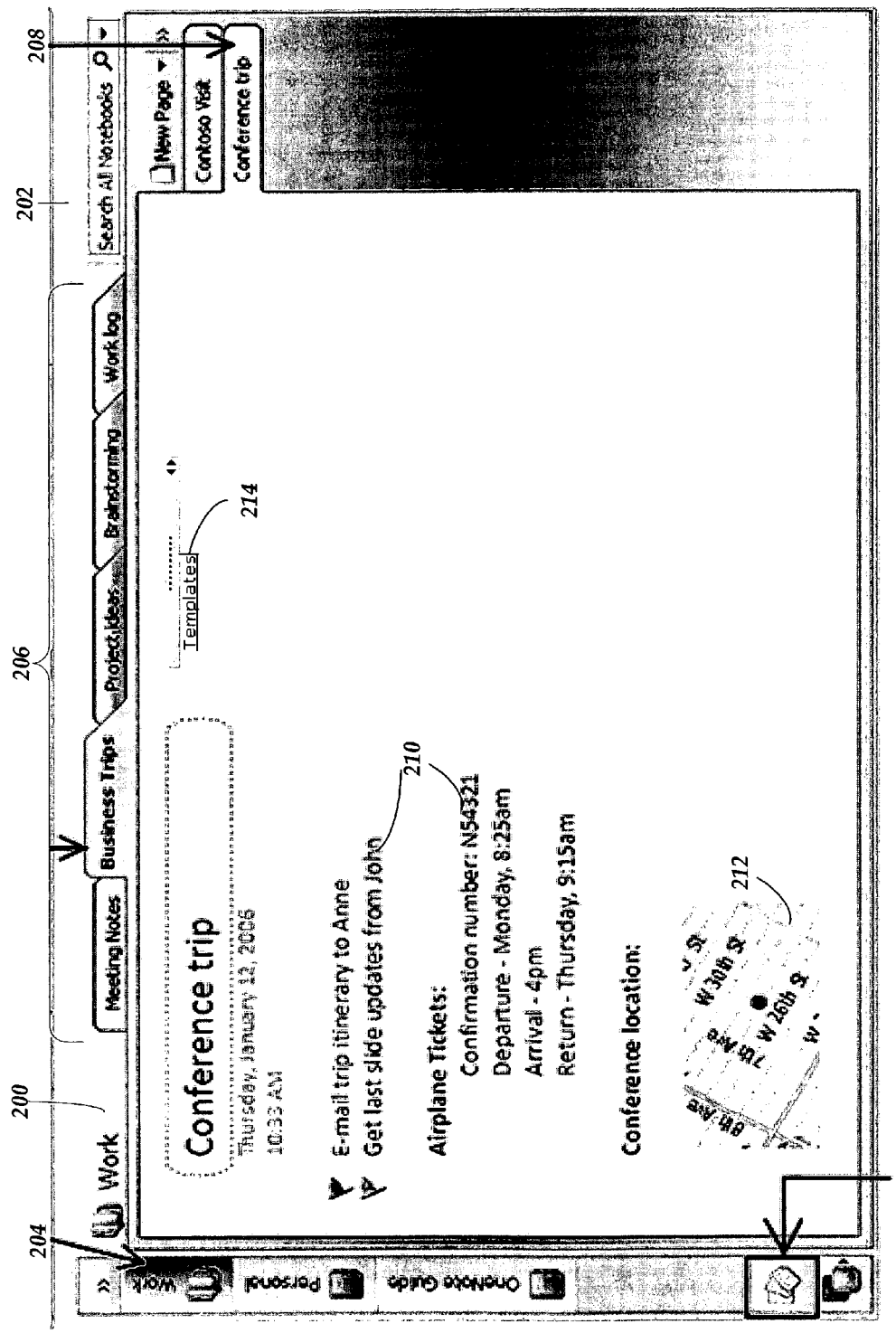
FIG. 2 depicts a user interface of a note taking application.

FIG. 2 depicts a user interface 200 of a note taking application 202, under an embodiment. The user interface 200 includes a number of interactive tools that enable a user to create, gather, organize, search, and share notes, clippings, thoughts, reference materials, and other information, but is not so limited. The user interface 200 can display notes and other information, and is organized by notebooks 204, sections 206, and pages 208. As shown, the user has a Work notebook 204 open. The Work notebook 204 includes a number of sections 206, the sections include: Meeting Notes, Business Trips, Project Ideas, Brainstorming, and Work log. The sections 206 can be analogized to dividers inside of a notebook and each section tab is associated with a particular file in the file system.

As shown in FIG. 2, the user is currently viewing a Conference trip page 208 in the Business Trip section. The Business Trip section also includes a "Contoso Visit" page. The "Conference trip" page 208 is populated with text 210, a map image 212, and a user-created link 214. If the user clicks on the link 214, the note-taking application 102 and locator component 106 are configured to locate the target of the link 214 and provide the associated target (e.g. a template page) to the user. The creation of a link of an embodiment is described below in conjunction with FIGS. 3A-3F.

Figure 3A:
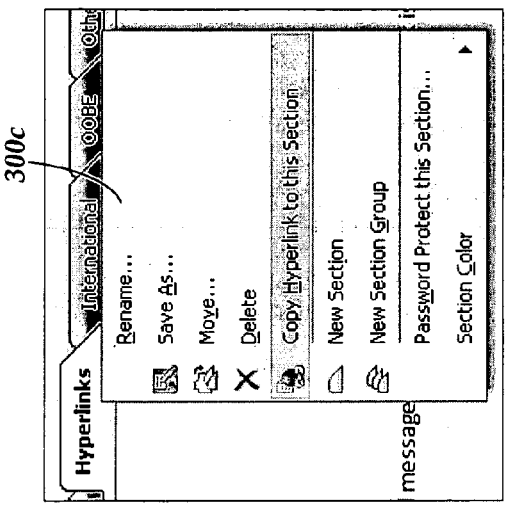
FIGS. 3A-3F depict a number of user interface menus of a note-taking application.
Figure 3B:
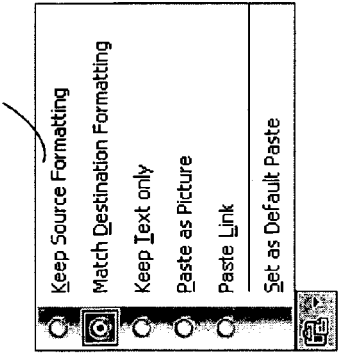
Figure 3C:
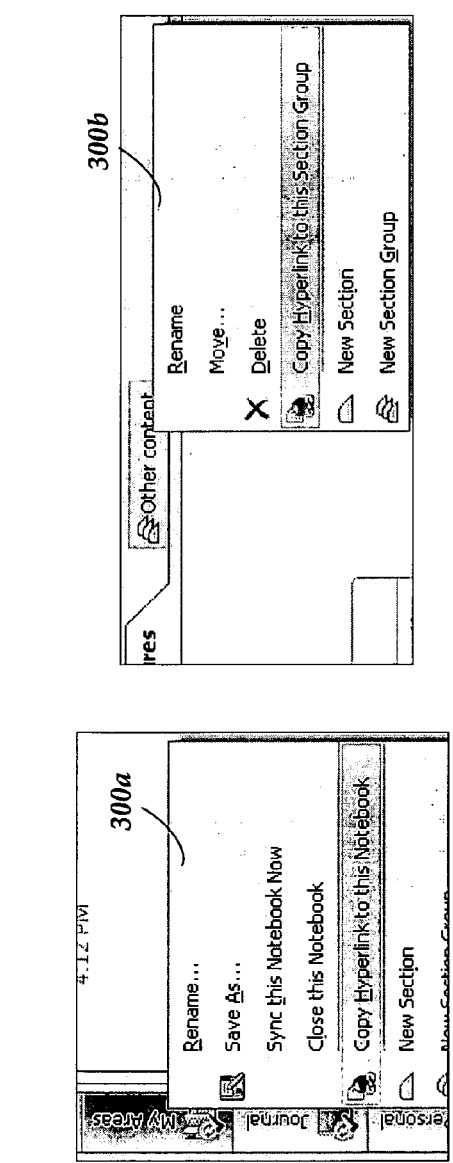

FIGS. 3A-3F depict a number of user interface menus 300a-300f of a note-taking application 102 after a user has right-clicked on a notebook, section group, section, page, and page object respectively. The note-taking application 102 and link component 106 operate to create one or more links based in part on a user's input. FIG. 3A depicts a user interface menu 300a after a user has right-clicked on a notebook. The user can use the user interface menu 300a to create a link which points to the respective notebook. FIG. 3B depicts a user interface menu 300b after a user has right-clicked on a section group. The user can use the user interface menu 300b to create a link which points to the respective section group. FIG. 3C depicts a user interface menu 300c after a user has right-clicked on a section. The user can use the user interface menu 300c to create a link which points to the respective section.

Figure 3D:
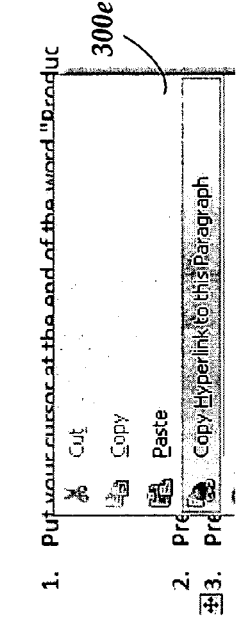
Figure 3E:
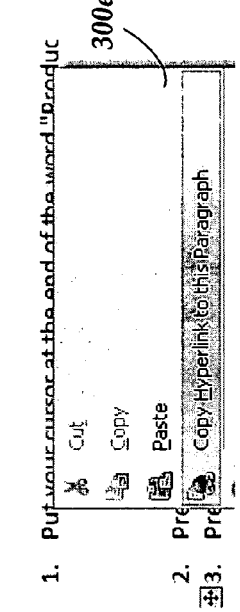

FIG. 3D depicts a user interface menu 300d after a user has right-clicked on a page. The user can use the user interface menu 300d to create a link which points to the respective page. FIG. 3E depicts a user interface menu 300e after a user has right-clicked on a page object (image, ink, drawing, embedded file, etc.) or a paragraph. The user can use the user interface menu 300e to create a link which points to the respective page object. Once the user has clicked on the pertinent "copy link to" menu item, the user can paste the link at a desired location (see FIG. 2 "Template" link).

For example, the user can paste the created link in a shared notebook, word processing document, e-mail, or other location. If a link is pasted into another application or location outside of the note-taking application 102, the link will be configured as an absolute link (an absolute path to the link target, as described below). A user can also use the note-taking application 102 to right-click on a word or phrase on a page, and then click "Create Linked Page." Thereafter, the note-taking application 102 and link component 106 operate to create a link to the page with the associated title at the end of the current section and the selected word or phrase will be linked thereto.

Figure 3F:
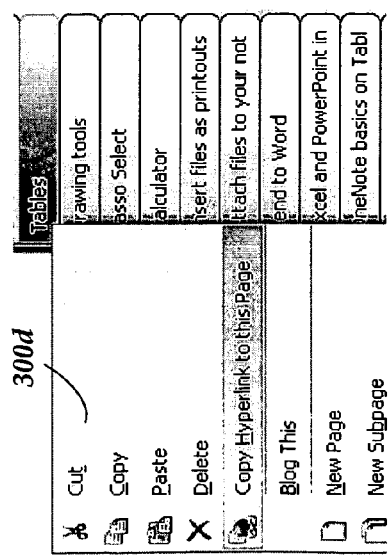

FIG. 3F depicts a user interface menu 300f which provides a number of options to a user after the user has pasted or dragged and dropped a notebook, section group, section, page, and/or page object to a page of the note-taking application 102. As shown in FIG. 3F, one of the options provided to the user is the "Paste Link" option. If the user selects the "Paste Link" option, instead of pasting the item, the note-taking application 102 is configured to create a link to the associated item. The note-taking application 102 is further configured to provide a friendly name for the link that can be derived from the title of the link target for example.

Figure 4A:
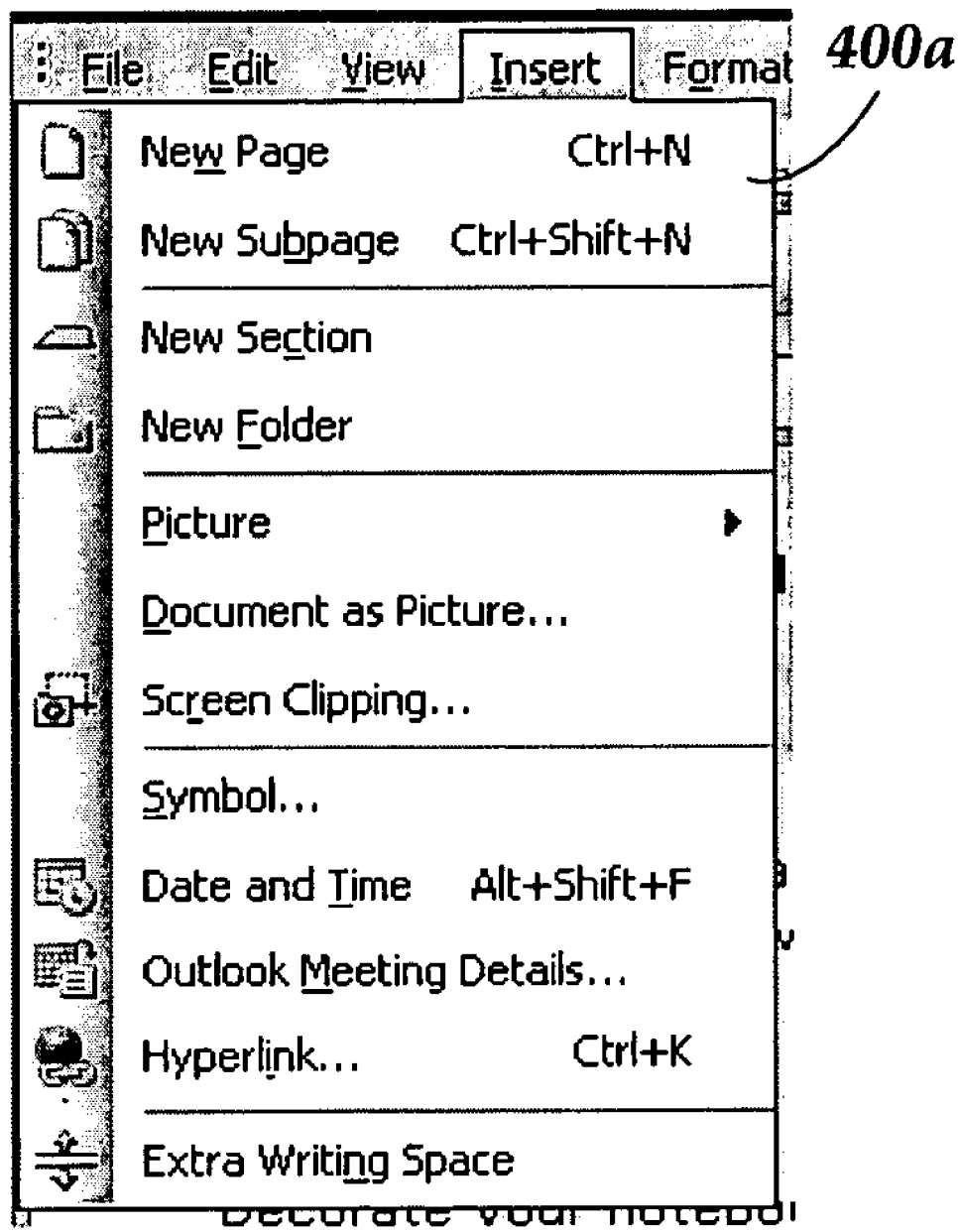
FIGS. 4A-4C depicts a number of user interface panes of a note-taking application.
Figure 4B:
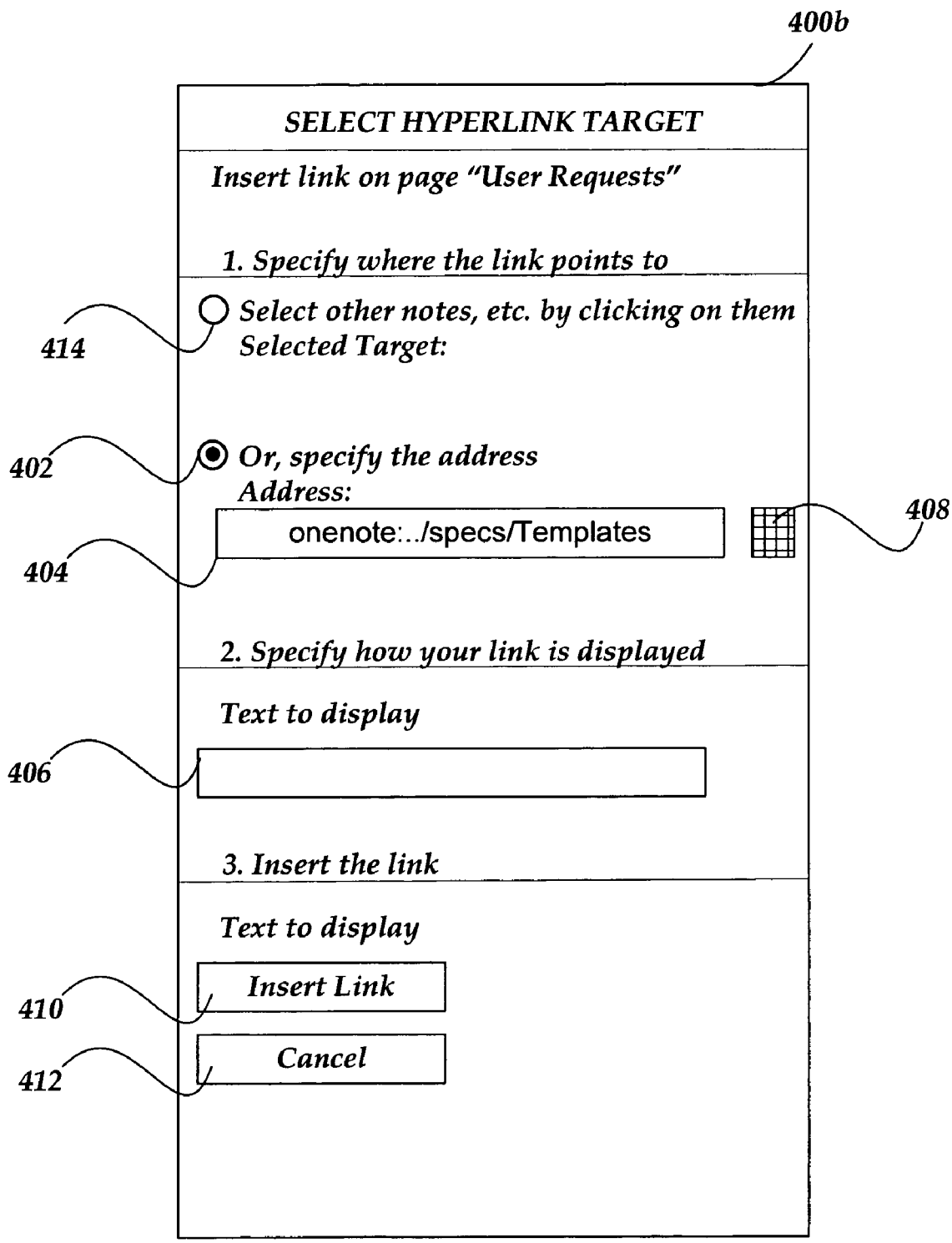
Figure 4C:
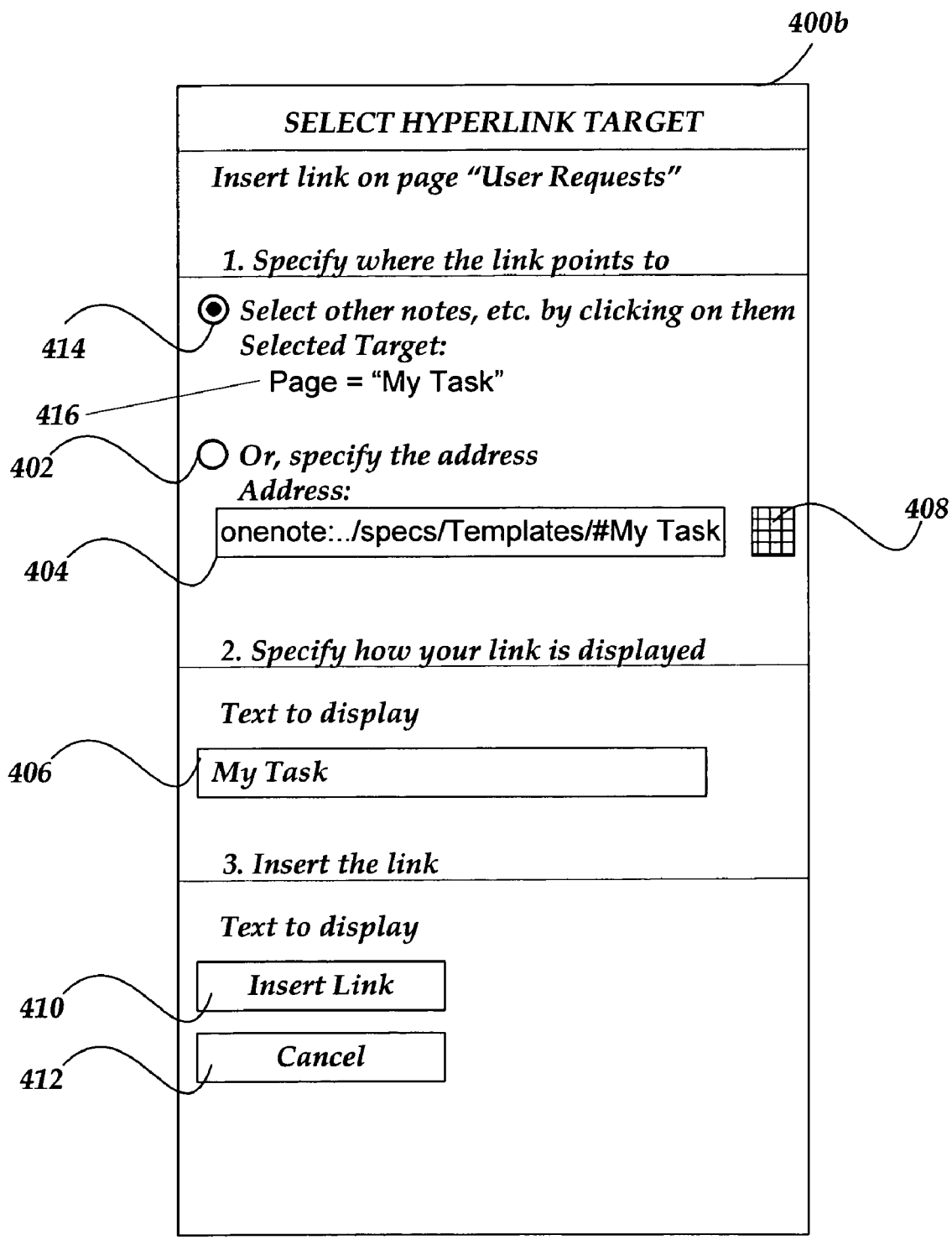

FIGS. 4A-4C depict a number of user interface panes 400a and 400b of a note-taking application, under an embodiment. As shown in FIG. 4A, a user can use the user interface pane 400a to insert a hyperlink. The user can also use the shortcut "Ctrl-K" to insert a hyperlink. After the user has clicked "Insert Hyperlink" or used the shortcut "Ctrl-K", the user interface pane 400b of FIGS. 4B-4C is presented to the user by the note-taking application 102, in accordance with an embodiment. The pane 400b is displayed with (e.g. adjacent to) the note organizing user interface 200 from FIG. 2, such that the user can browse their notes, while selecting a link target.

As shown in FIG. 4B, the address radio button 402 is selected by default. If the user has input (e.g. pasted, typed, etc.) a selection (e.g. path to link target) in the address field 404, the text of the selection is populated into the "Text to display" field 406 (e.g. friendly name). The user can also use the folder button 408 to bring up the file dialog for the user to select a file. When the user returns from the dialog after making a selection, the address is automatically populated in the address field 404 with the absolute address (e.g. onenote:../specs/Templates) of the file, web page, or other item. The "Text to display" field 406 can be set the same as the uniform resource locator (URL), unless it was already specified by the user. The user can click the "Insert Link" button 410 to insert the link. Alternatively, the user can click the "Cancel" button 412 to cancel the operation.

FIG. 4C depicts the user interface pane 400b after a user has opted to select a target for a link by interacting with the radio button 414. In an embodiment, the note-taking application 102 is configured to predict and/or determine a link target based in part on the input of a user after the user has opted to select a target using the user interface pane 400b. The note-taking application 102 is configured to track the user's input (e.g. click, navigation, selection change, etc.) and predict a potential link target based on the user's input. For example, a user can navigate around their notes, clicking on notebooks, sections, pages, and page objects, and the note-taking application 102 tracks the user interaction. The user can navigate and use other features of the note-taking application 102 while the user interface pane 400b is open. For example, the use can open other panes and menus (e.g. may want to use search to find a target) and also continue to edit notes.

As described above, the note-taking application 102 is configured to track a user's interaction and/or predict a link target based in part on the interaction. In one embodiment, the note-taking application 102 is configured to track the user's interaction and predict the user's intended link target by populating the "Selected target" field 416, "Address" field 404, and/or "Text to display" field 406. These fields can be repopulated with updated information as the user navigates through note-related information. For example, if a user has clicked a particular section, the note-taking application 102 will populate the "Selected target" field 416, "Address" field 404, and/or "Text to display" field 406 with the associated section information (e.g. section name, path, and friendly name). If the user then clicks a page in the section, the note-taking application 102 will repopulate the "Selected target" field 416, "Address" field 404, and/or "Text to display" field 406 with the associated page information (e.g. page name, path, and friendly name) (see FIG. 4C). That is, the note-taking application 102 keeps track of what the user is doing as part of a linking operation, thereby reducing the amount information that the user is required to remember in association with creating a link to a link target. The creation of a link by the note-taking application 102 appears as a seamless process to the user.

For example, the note-taking application 102 can populate the "Selected target" field 416 as follows, depending on the target the user has interacted with:

1) if the user clicks a notebook: 'Notebook "<notebook name>"'

2) if the user clicks a folder: 'Folder "<folder name>"'

3) if the user clicks a section: 'Section "<section name>"'

4) if the user clicks a page: 'Page ""'

5) if the user clicks any page object: use the string as specified for the page object (text, pictures, etc.) in section Friendly name. Example: 'Picture on page "User Requests"'.

In one embodiment, the note-taking application 102 is configured to interpret a navigation event as selecting a target after a user has selected the radio button 414. For example, the note-taking application can be configured to interpret the following user interactions and make predictions based thereon, but is not so limited:

1) The target is predicted to be a folder, section, or page when a user navigates to a folder, section, or page via a tab.

2) The target is predicted to be a notebook, folder, or section when a user navigates to a notebook, folder, or section icon via the navigation tree.

3) The target is predicted to be a page when a user navigates to a page by Ctrl+Page Down/Up.

4) The target is predicted to be a section when a user navigates to a section by Ctrl+TAB/Shift TAB.

5) The target is predicted to be a page when a user navigates to a page from the Page List pane.

6) The target is predicted to be a page if a user has navigated to a page as a result of search.

7) The target is predicted to be a notebook, folder, or section if a user selects File→Open→Notebook, Folder, or Section.

8) The target is predicted to be a note flag if a user navigates to a note flag (e.g. from Note Flag Summary).

9) The target is predicted to be a page if a user selects a page tab.

10) The target is predicted to be a section if a user selects a section tab.

11) The target is predicted to be a new location of user input (e.g. relocated page object) or a selection on the page.

12) The target is predicted to be a notebook, folder, section, page, or page object if a user right-clicks on any notebook, folder, section, page, or page object and does "Copy address" (the address and friendly name are also populated in the respective fields).

In one embodiment, the "Insert Link" button 410 is grayed out until both the "Address" field 404 and the "Text to display" field 406 are populated. If the "Address" field 404 and the "Text to display" field 406 are populated, when a user clicks on "Insert Link" 410, the link is inserted at a location on the original page where the user clicked Insert→Hyperlink and the note-taking application 102 navigates back to that page. If the page where the link should be inserted has become unavailable (e.g. a password protected section is locked), the user will see a password prompt. If the password is correct, the link is inserted successfully. If the user cancels out of the password dialog, the insertion action is cancelled by the note-taking application 102. If the user clicks the "Cancel" button 412 or closes the user interface pane 400b, the link is not inserted and the user is returned to the original page and/or selection.

Figure 5:
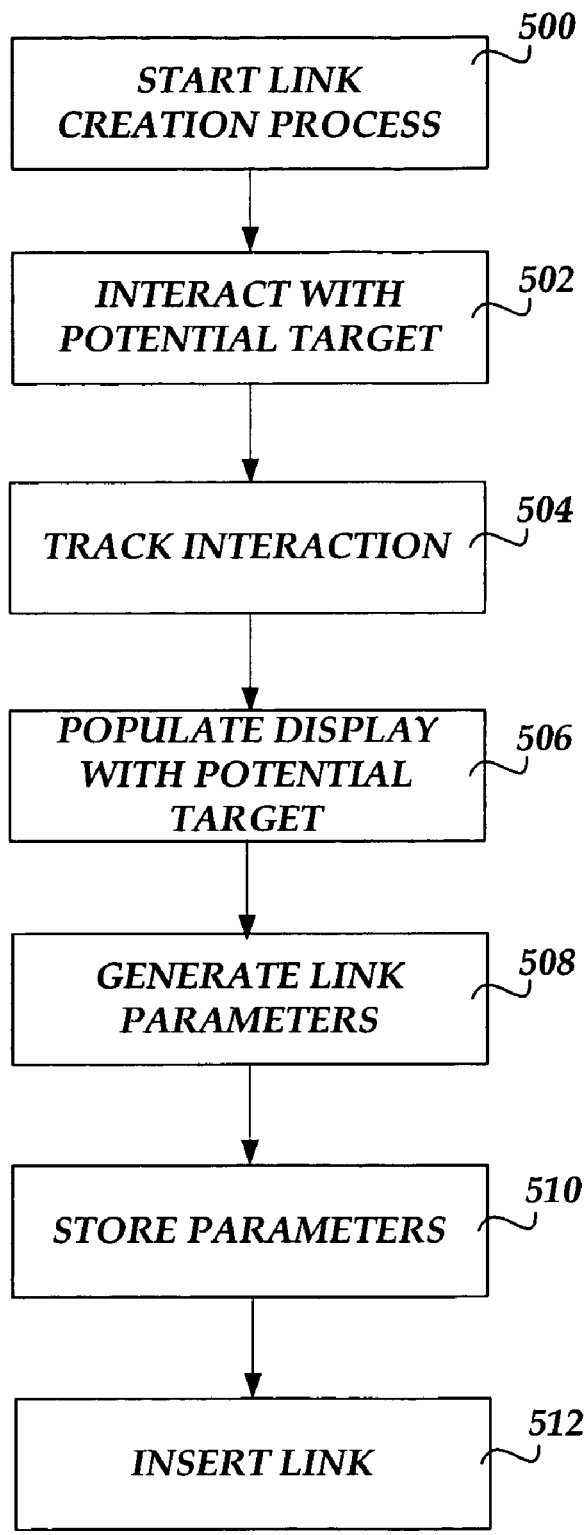
FIG. 5 is a flow diagram illustrating the creation of a link.

FIG. 5 is a flow diagram illustrating the creation of a link, under an embodiment. As described briefly above, the note-taking application 102 and link component 106 are configured to allow a user to create links in a quick and efficient manner. Correspondingly, a user does not have to endure a difficult and laborious process to create a link to a desired target. In one embodiment, a user can use a note-taking application to create a link to target information. For example, a user can use the user interface pane 400b to create a link to a note-related target.

FIG. 5 will be described in the context of a note-taking application, such as the note-taking application 102 of FIG. 1. However, the teachings can be applied in other contexts where it is desirable to link information and use a link to access the linked information. As shown in FIG. 5, at 500, a user begins the link creation process using the note-taking application 102. For example, a user can create a link as described above in conjunction with FIGS. 3A-3E.

In one embodiment, the user can insert a link using an insert command and thereafter use one or more user interface panes (e.g. FIGS. 4A-4C) to create a link to a desired target. For example, a link target can refer to a notebook, folder, section, page, page object, etc. that the link points to and/or navigates to when clicked. The user may want to create a link to a notebook, section group, section, page, or page object for example. The link can be named (automatically or manually) so that the user instantly recognizes the link target. The link is configured to endure changes thereto, including name changes. The note-taking application 102 is configured to include various parameters with a link when creating the link. As described below, the link parameters can be used when locating a link target.

At 502, a user can interact with the note-taking application 102 to select a potential desired target. For example, a user may want to select a particular notebook, section, page, page object, and/or some other item. At 504, the note-taking application tracks and captures items (e.g. notebooks, sections, pages, page objects, etc.) and associated parameters as the user clicks on one or more items in the note-taking application 102. At 506, the note-taking application 102 populates a display (e.g. one or more fields of the user interface pane 400b) to inform the user of a potential link target. The note-taking application 102 refreshes or repopulates the display with new target information as a user further interacts with notes (e.g. clicks another item). The note-taking application 102 also maintains the path information associated with each link target as it is populated in the display.

At 508, the note-taking application 102 generates link parameters for the link target. For example, the note-taking application 102 can generate link parameters for the link target if the user is no longer selecting items or after some amount of idle time. At 510, the note-taking application 102 stores the link parameters to memory. The stored parameters and/or other information can be used by the note-taking application 102 or some other application when locating and/or navigating to a link target. The link parameters also can be included as part of the link address. For example, the link address can include information that is associated with the path to the target and/or location of the link.

In an embodiment, the note-taking application 102 generates and stores parameters associated with an absolute link path, a relative link path, and/or a maximally relative link path to a target. In one embodiment, the note-taking application 102 generates and stores parameters associated with a relative link path based on a user's input, such as after a paste operation for example. At 512, the user can insert the link at a desired location in the note-taking application or some other location.

Thereafter, when a user interacts with the link (e.g. clicks the link, presses enter, etc.), if the link target is located, the link target is provided to the user (e.g. notebook, section, page, page object, etc.). In one embodiment, the link target points to a page object, and the note-taking application 102 is configured to locate a page and then look for the page object. For example, a link may specify which object the page should be scrolled to, such as an outline object (e.g. container of data), an outline element (e.g. paragraph), ink, an image, an icon for inserted document, etc. If the object is not found, the note-taking application 102 is configured to navigate to the target page or section.

The note-taking application 102 is configured to generate and/or store an absolute path, a relative path, and/or a maximally relative path to a link target. An absolute path refers to a full link to a location associated with a note-taking application 102 (e.g. notebook, section group, section, page, page object, etc.). In one embodiment, an absolute path is included on a clipboard (e.g. global clipboard) when a link is created and the relative path is created when the link is pasted to some location in a note-taking application 102. The link and absolute path provided on the clipboard has all the information needed to get to a notebook (e.g. includes the full network address). For example, if a user pasted a link in a different application, such as in a word processing document, an e-mail, etc., the path remains absolute and will navigate to the link target if clicked from the different application under certain conditions (e.g. server available, user credentials, user authentication, etc.). As further example, if a user pasted a link from one computing device to a different computing device, the link path will remain absolute.

In one embodiment, the note-taking application 102 is configured to create a relative path to a target when a link is pasted to a location in the note-taking application 102. The relative path is associated with the absolute path but includes fewer parameters than the absolute path. Moreover, the relative path is configured to include as few details as necessary to navigate to a link target. Correspondingly, the note-taking application 102 uses a minimal amount of information (and memory) to create the relative path from the absolute path. The relative path also remains valid if a user moves large chunks of the hierarchal structure. That is, links contained within the relocated structure are configured to continue to point to a proper target.

An absolute path can become maximally relativized under certain conditions. In one embodiment, an absolute path gets maximally relativized whenever a link created by the note-taking application 102 is pasted onto a notebook page. The maximally relative path can also include the target page name if the link is to a page or page object (e.g. "..\..\Specs.one#Templates"). The "#" identifies a page.

Take for example the relative link path:
"onenote:
..\Misc%20Work\Meetings.one#Content%20Council."

The above path is deciphered to mean go up from the current folder (".."), then go to folder "Misc Work", then to section "Meetings", then to page "Content Council". The total path to the folder "Misc Work" is not required.

As part of the link pasting or positioning operation, in one embodiment, the note-taking application 102 is configured to include a base path as part of the link. The base path is included as part of the relative path and defines an absolute path to the location (e.g. section, page, etc.) where the link is pasted or positioned. That is, the note-taking application 102 can use the base path to determine where the link is located.

For example, the following link includes a base path:
"onenote:..\Misc%20Work\Meetings.one#Content%20Council&base-path=tkzaw-pro-16\Mydocs4\username\My%20Documents\ OneNote%20Notebooks."

As described above, if a target is on a different share, it may not be relativized.

For example:
"onenote:///\\server06\Shared\Shared%20Notebooks\OneNote%20Best%20Practices\More%20Cool%20Features.one#Tables."

This absolute path will not be relativized since the link is associated with a shared notebook.

For example, an absolute path may include:
"onenote:///\\server06\Shared\Shared%20Notebooks\OneNote%20Best%20Practices\More%20Cool%20Features.one#Tables".

"OneNote%20Best%20Practices" refers to a particular notebook. "More%20Cool%20Features.one" refers to the particular section and "Tables" is the page associated with the section. However, the user may only see a friendly name for the link, such as "Tables" for example. The path can be inspected if the user hovers over the link. The user can also right click on the link and view its properties. As described above, if the link is created by the note-taking application 102, the link is configured to include information that can be used to locate the link and/or link target if an associated parameter has changed.

A link created by the note-taking application 102 may include additional information that can be used when locating a link target. In one embodiment, a link includes one or more target identifiers, such as Globally Unique Identifiers (GUIDs) for example. The one or more GUIDs can be included as part of a link and used to locate a target. For example, a link may include:
"onenote:http://onetest/PM%20Team%20Notebook/Home.one#OneNote%20Example%20Customers§ionid={2C741A71-2F80-4A1A-85B2-5CE98A397837}&
page-id={6D4390E2-8DDC-4D88-B90D-F0DADECDA
BCC}&end."

The section-id and page-id refer to GUIDs that the note-taking application 102 can use to locate a particular target with additional granularity. The section-id GUID is associated with a particular section. Likewise, the page-id GUID is associated with a particular page. The section GUID is "2C741A71-2F80-4A1A-85B2-5CE98A397837" and the page GUID is "6D4390E2-8DDC-4D88-B90D-F0DADECDABCC". The note-taking application 102 can use one or more GUIDs to locate a target when the name of a page is changed for example. In such a circumstance, the note-taking application 102 may not be able to locate the target based on the relative path and page title, so it can use the one or more GUIDs to locate the target. A link may include one or both of the GUIDs. A link may also include a page object identifier (e.g. GUID).

Once a link is created with the note-taking application 102, the link can be interacted with to navigate to a target. For example, the note-taking application 102 can use the absolute path and/or relative path to the target when navigating to the target. The link can be interacted with (e.g. "clicked") while a user is using a note-taking application or some other application. Accordingly, user can use a link (e.g. clicking the link) to access the associated target information, such as a notebook, section group, section, page, page object, for example. The note-taking application 102 is also configured to create link to external target information, such as information on the internet, in a shared notebook, etc. A user can associate a friendly name with a link so that the link is readily identified upon examination. As described above, a friendly name can be automatically applied by the note-taking application as the name of the link target (e.g. notebook name, folder name, section name, page name, etc.).

Figure 6:
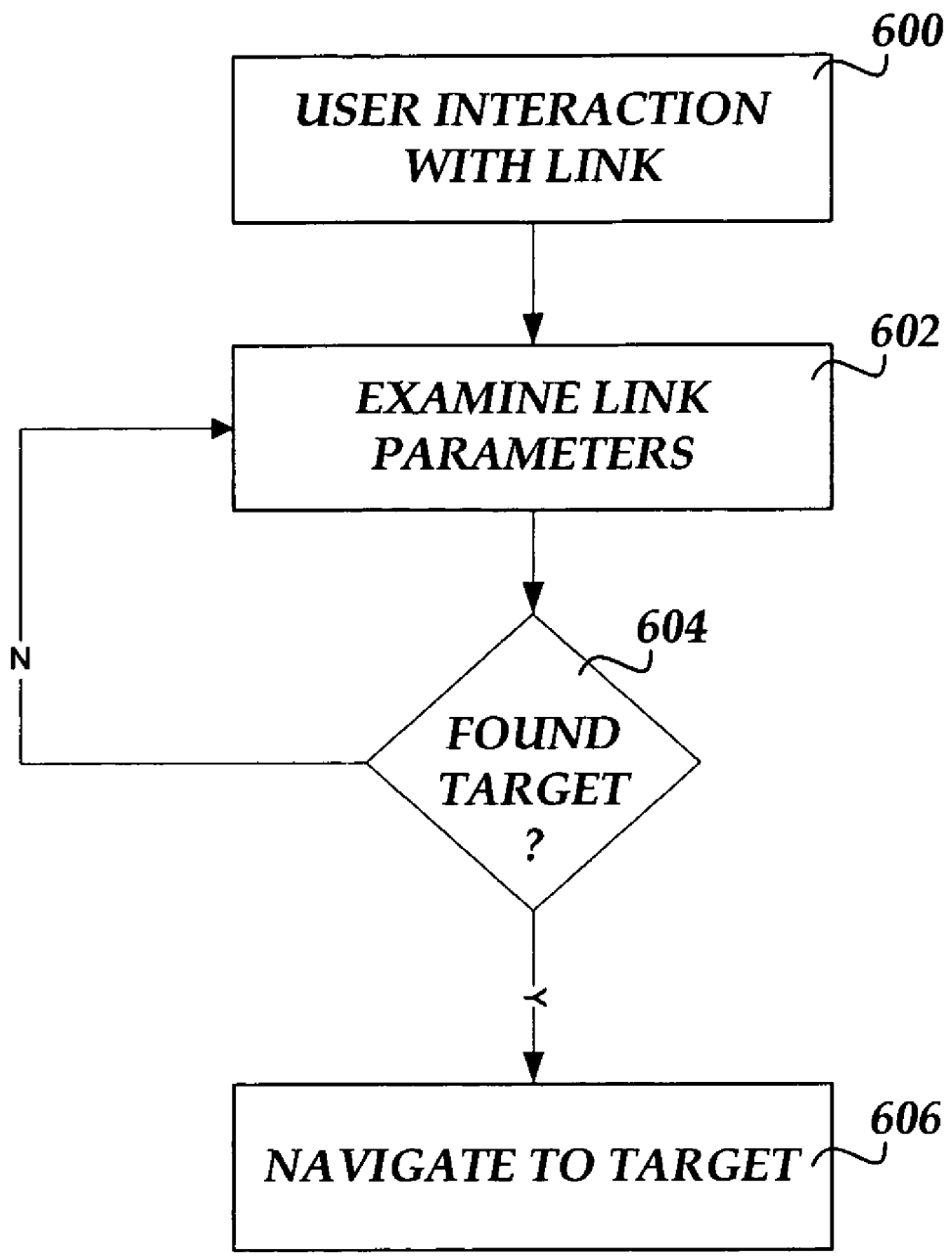
FIG. 6 is a flow diagram illustrating the locating of a link target.

FIG. 6 is a flow diagram illustrating the locating of a link target, under an embodiment. At 600, a user interacts with a link (e.g. clicks the link). At 602, the note-taking application 102 examines a number of parameters associated with the link. In one embodiment, the note-taking application 102 examines an absolute, a relative, and/or a maximally relative path to target. The absolute path, relative path, and/or maximally relative path can include a target page name if the link points to a page or page object (e.g. "..\..\Specs.one#Templates"). The note-taking application 102 also can examine the GUID of the target if the target is associated with a notebook section or page. In an alternative embodiment, the note-taking application 102 examines a base-path to the target (e.g. the absolute path to a section where the link is inserted). In another alternative embodiment, the note-taking application 102 can also examine the page object identifier if the target is a page object.

For example, a link and associated path may include parameters, such as:

"onenote:<maximally relative file path><#page title>&<Original section and page GUIDs>&base-bath=<path to original section where this link was pasted>".

If the target is not found at 604, the flow returns to 604, and the note-taking application is configured reexamine the link parameters, including additional link parameters, to locate the link target. If the target is found at 604, the note-taking application 102 navigates to the target at 606. If the target is not found after a certain number of attempts using various parameters, the note-taking application 102 is configured to, inform the user that the link is broken (e.g. displays an error message). The embodiments and examples described herein are not intended to limit. For example, the note-taking application 102 can perform the above-described steps in order, with greater or fewer steps, or in some other manner.

Some other features of the note-taking application 102 follow:

If a user copies to the clipboard (e.g. "Copy Link to this <X>"): the note-taking application 102 will use the following:

For HTML: "<a href="the onenote: link address">Friendly name of the link</a>".

The address can include: the absolute path to the target, target GUID, and the friendly name.

For example:

"onenote:///\\tkzaw-pro-16\Mydocs4\username\My%20Documents\OneNote%20Notebooks\Misc%20Work\Meetings.one#section-id={1021B20A-242A-46F1-A3FE-5D41DEF78070}&end".

For plain text the link address includes the same information as above.

If a user copies a link to clipboard from a link on a page, the note-taking application 102 will use the following:

For HTML: "<a href="onenote: link address as is">Text of the link (friendly name)</a>".

For plain text, the text of the link is used.

If a user right-clicks a link and selects "Copy Link", the note-taking application 102 will use the following:

For HTML: "<a href="onenote: link address as is">Text of the link (friendly name)</a>"

For plain text, the address of the link is used.

If the user selects only part of any link, the full address is still placed on the clipboard, but only the copied part is used for the friendly name.

If a user pastes a link onto a page, the note-taking application 102 is configured to perform the following:

1) If the link is relative and specifies no base path, it is pasted as is.

2) If the link is relative and a base path is given, the note-taking application 102 constructs the absolute path to the target.

3) If the link is absolute, the note-taking application 102 attempts to maximally relativize the link and store the relative path. If the note-taking application 102 was able to relativize the link, it adds a base path (e.g. the path to the current section/page where the link is being pasted).

The table below includes a number of link examples and the associated procedures used by the note-taking application.

TABLE

| | |
|---|---|
| onenote:///C:\My Notebook\Meetings.one#Status Meeting&page-id={2179C5D3-EBFF-11CF-B6FD-00AA00B4E220}&object-id={71902B16-A458-0DCF-078C-D560D9993E3A} | Go to page "Status Meeting" in Meetings.one, and to the page object with the specified id. If the path is broken, find the page with the specified page-id in all open notes, and then go to the page object on that page |

TABLE-continued

| | |
|---|---|
| onenote:///\\machineA\shareB\My Notebook\Work | Go to folder "Work" |
| onenote:http://office/personal/username/Shared Documents/Test.one§ion-id={2179C5D3-EBFF-11CF-B6FD-00AA00B4E220} | Go to section "Test" on the specified path. If the path is broken, look for the section-id in all open notes. |
| onenote:..\Spec.one§ion-id={2179C5D3-EBFF-11CF-B6FD-00AA00B4E220}&base-path=onenote\PMNotebook\Work\Ideas.one | Go to the parent folder and look for section "Spec". If it is not found, look for the section id in all open notes. If that is not found, follow the base path, and from there follow the relative path —which means go to path: \\onenote\PMNotebook\Spec.one |
| onenote:object-id={71902B16-A458-0DCF-078C-D560D9993E3A} | Go to object on the current page (bug: this appears not to work in product) |
| onenote:#User Requests&object-id={71902B16-A458-0DCF-078C-D560D9993E3A} | Go to page "User Requests" in the current section and then to the object |
| onenote:#User Requests | Go to page "User Requests" in the current section |
| onenote:Templates.one#User Requests&object-id={71902B16-A458-0DCF-078C-D560D9993E3A} | Go to section "Templates" in the current folder, then to page "User Requests", then to object |
| onenote:Specs v2/Templates.one#User Requests | Go to subfolder "Specs v2" in the current folder, then to section "Templates", then to page "User Requests" |
| onenote:../Specs/Templates.one#User Requests | Go up from the current folder, then go to folder "Specs", then to section "Templates", then to page "User Requests" |
| onenote:Specs | Go to subfolder Specs in the current folder |
| onenote:../../Templates.one | Go two folders up from the current folder, then to section "Templates" |

If the link is to another object on the same page, the note-taking application 102 maintains the page info if the link is maximally relativized, since the base path may not contain the page info.

For example:

"onenote:#Page&page-id={<GUID>}&object-id={<GUID>}&base-path=C:\My Documents\My Notebook\Templates.one".

As described herein, a user can create and use one or more links to different items associated with a note-taking application. The created links can also be used in conjunction with other applications, such as word processing, e-mail, and other applications that link to items of the note taking application. The embodiments described herein can be used with a number of applications that use links to point and navigate to structured and other information.

Exemplary Operating Environment

Figure 7:
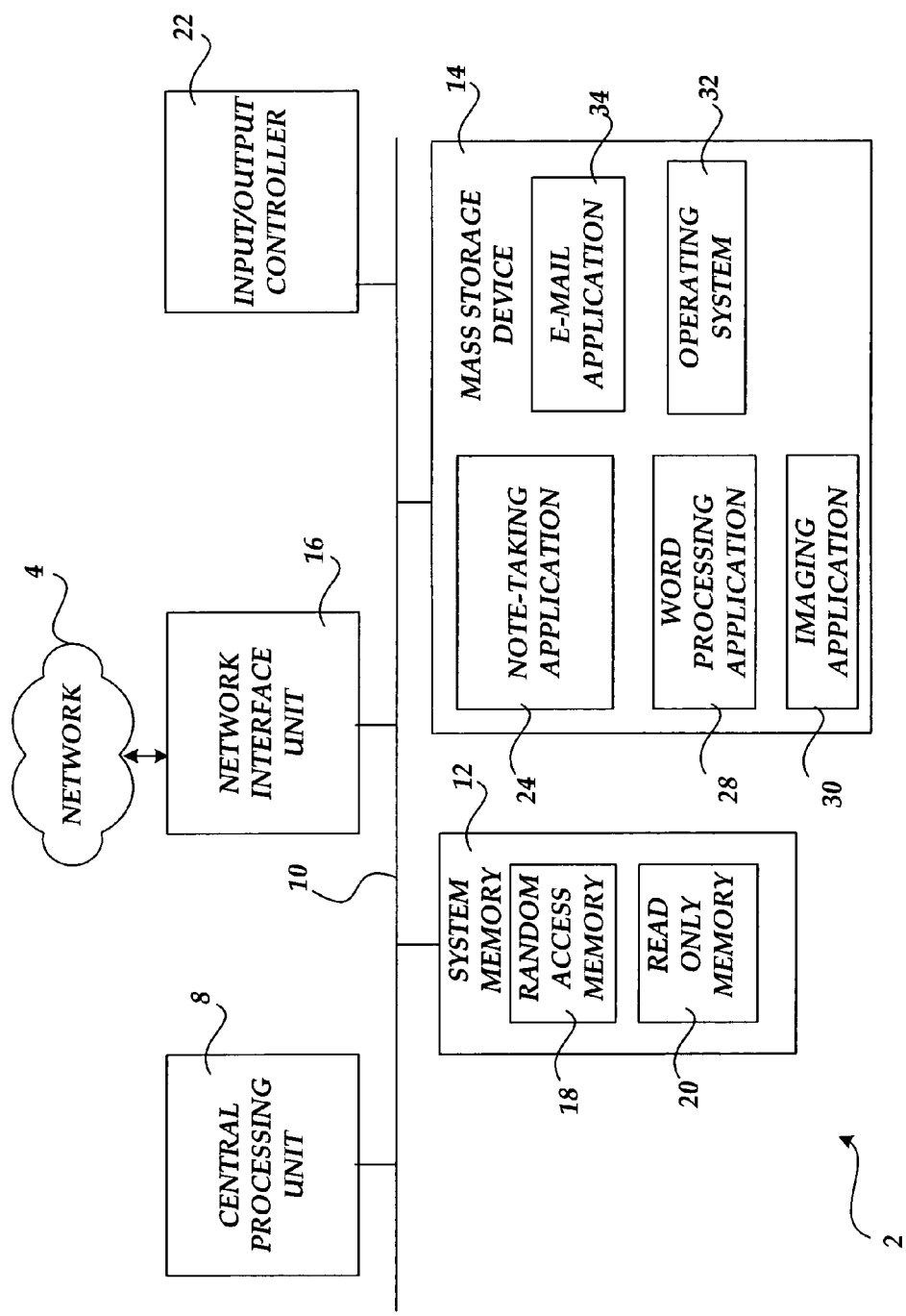
FIG. 7 is a block diagram illustrating a computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs, such as a note-taking application 24, and other program modules. In one embodiment, the note-taking application 24 comprises the OneNote® note-taking application program from MICROSOFT CORPORATION of Redmond, Wash. However, the embodiments described herein may be utilized with other system, applications, modules, etc to provide resilient links to structured and/or hierarchal information. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS XP operating system from MICROSOFT CORPORATION of Redmond, Wash. The mass storage device 14 and RAM 18 may also store one or more program modules. In particular, the mass storage device 14 and the RAM 18 may store application programs, such as a word processing application 28, an imaging application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer readable storage medium including executable instructions which, when executed, associate information by:

tracking interaction by a user with one or more potential link targets, wherein the one or more potential link targets are associated with a hierarchal information structure;

populating a user interface of a display with a number of parameters associated with the one or more potential link targets as the user interacts with the one or more potential link targets, wherein the user interface is repopulated as the user interacts with different link targets;

generating one or more paths to the one or more potential link targets, wherein the one or more paths are based in part on the one or more potential link targets;

creating a link to a link target based in part on a user interaction associated with the one or more potential link targets, the link having link parameters including a link path and a friendly name, wherein the link path includes one of an absolute link path, a relative link path, and maximally relative link path and is based in part on the user interaction in creating the link, and the friendly name is automatically applied based in part on a link target name, the creating including one of pasting the link as is if the link is relative and specifies no base path, pasting the link and constructing the absolute link path if the link is relative and includes a base path, and pasting the link including attempting to maximally relativize the link and store the relative path if the link is absolute including adding the base path to relativize the link; and, storing the link parameters to memory.

2. The computer-readable storage medium of claim 1, wherein the instructions, when executed, associate information by using the link to the link target based in part on user input, wherein the link target is based on a selected target of a note-taking application.

3. The computer-readable storage medium of claim 2, wherein the instructions, when executed, associate information by generating the link to the link target, wherein the link relates items of the hierarchal information structure.

4. The computer-readable storage medium of claim 3, wherein the instructions, when executed, associate information by generating the link to the link target, wherein the link relates items of the hierarchal information structure and the hierarchal information structure includes a notebook, section, page, and page object.

5. The computer-readable storage medium of claim 1, wherein the instructions, when executed, associate information by generating the one or more paths to the one or more potential link targets, wherein the one or more potential link targets are selected from items of a group consisting essentially of a notebook, section group, section, page, and page object.

6. The computer-readable storage medium of claim 1, wherein the instructions, when executed, associate information by generating the one or more paths to the one or more potential link targets, wherein the one or more paths are selected from at least one of an absolute and a relative path.

7. The computer-readable storage medium of claim 1, wherein the instructions, when executed, associate information by navigating to the link target using the link.

8. The computer-readable storage medium of claim 1, wherein the instructions, when executed, associate information by populating the display with the number of parameters associated with the one or more potential link targets, wherein the number of parameters comprise parameters associated with a note-taking application.

9. The computer-readable storage medium of claim 1, wherein the instructions, when executed, associate information by populating the display with the number of parameters associated with the one or more potential link targets including at least one of a link address and a selected target.

10. The computer-readable storage medium of claim 1, wherein the instructions, when executed, associate information by populating the display with the number of parameters associated with the one or more potential link targets, wherein the number of parameters are associated with one or more potential link targets selected from a group consisting essentially of a notebook, section, page, and page object.

11. The computer-readable storage medium of claim 10, wherein the instructions, when executed, associate information by populating the display with one or more friendly names associated with the one or more potential link targets.

12. The computer-readable storage medium of claim 1, wherein the instructions, when executed, associate information by tracking the one or more potential link targets based in part on a navigation event.

13. A system to associate information comprising:
an organizer component to organize the information according to a hierarchal information structure;
a link component to predict one or more potential link targets based on user input, wherein the link component is to create a link to at least one of the one or more potential link targets after a navigation event and the link includes a number of parameters associated with a path to a link target, wherein the link component creates the link to the link target based in part on a user interaction associated with the one or more potential link targets, the link having link parameters including a link path and a friendly name, wherein the link path includes one of an absolute link path, a relative link path, and maximally relative link path and is based in part on the user interaction in creating the link, and the friendly name is automatically applied based in part on a link target name, wherein the link component is to create the link by one of pasting the link as is if the link is relative and specifies no base path, pasting the link and constructing the absolute link path if the link is relative and includes a base path, and pasting the link including attempting to maximally relativize the link and store the relative path if the link is absolute including adding the base path to relativize the link; and,
a display component comprising a computer display to display a user interface and at least one parameter associated with the one or more potential link targets based in part on the tracked input as the user interacts with the one or more potential link targets, wherein the user interface is refreshed with updated parameters associated with the one or more potential link targets.

14. The system of claim 13, wherein the link component is further configured to create a link to items of a group consisting essentially of a notebook, section group, section, page, and page object.

15. The system of claim 13, wherein the display component is further configured to display the user interface to include at least one of a link address and a selected target associated with the one or more potential link targets.

16. A method of associating information comprising:
interacting with one or more potential link targets, wherein the one or more potential link targets are associated with a hierarchal information structure;
monitoring the interaction by storing a number of parameters associated with the one or more potential link targets;
displaying the number of parameters associated with the one or more potential link targets by populating a user interface with the number of parameters as the user interacts with the one or more potential link targets, wherein the user interface is updated after interaction with a different link target;
determining a link to a link target, wherein the link includes a path to the link target and the link target is based on at least one of the one or more potential link targets; and,
creating the link to the link target based in part on a user interaction associated with the one or more potential link targets, the link having link parameters including a link path and a friendly name, wherein the link path includes one of an absolute link path, a relative link path, and maximally relative link path and is based in part on the user interaction in creating the link, and the friendly name is automatically applied based in part on a link target name, the creating including one of pasting the link as is if the link is relative and specifies no base path, pasting the link and constructing the absolute link path if the link is relative and includes a base path, and pasting the link including attempting to maximally relativize the link and store the relative path if the link is absolute including adding the base path to relativize the link.

17. The method of claim 16, further comprising creating the link to the link target after a navigation event.

18. The method of claim 16, further comprising creating the link to items of a group consisting essentially of a notebook, section, page, and page object.

19. The method of claim 16, further comprising populating one or more display fields with information associated with the one or more potential targets.

* * * * *